United States Patent
Meier

(10) Patent No.: US 11,886,745 B2
(45) Date of Patent: Jan. 30, 2024

(54) ILLEGAL OPERATION REACTION AT A MEMORY DEVICE

(71) Applicant: Micron Technology, Inc., Boise, ID (US)

(72) Inventor: Nathaniel J. Meier, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 46 days.

(21) Appl. No.: 17/660,938

(22) Filed: Apr. 27, 2022

(65) Prior Publication Data

US 2023/0350604 A1 Nov. 2, 2023

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ........ G11C 11/4076; G06F 1/08; G06F 1/10; G06F 3/0604; G06F 3/0659; G06F 3/0671; G06F 1/3275
See application file for complete search history.

(56) References Cited

U.S. PATENT DOCUMENTS

| | | | |
|---|---|---|---|
| 10,990,317 B2 | 4/2021 | Veches et al. | |
| 11,354,064 B2 * | 6/2022 | Richter | G06F 3/0688 |
| 2019/0198128 A1 * | 6/2019 | Fan | G11C 11/4085 |
| 2019/0332766 A1 * | 10/2019 | Guri | G06F 21/565 |
| 2019/0348099 A1 * | 11/2019 | El-Mansouri | G11C 11/2257 |
| 2020/0210110 A1 * | 7/2020 | Richter | G11C 7/22 |
| 2022/0374168 A1 * | 11/2022 | Ayyapureddi | G06F 3/0673 |
| 2023/0135869 A1 * | 5/2023 | Yen | G11C 11/40626 365/222 |
| 2023/0214925 A1 * | 7/2023 | Cella | G06Q 20/367 705/37 |

* cited by examiner

*Primary Examiner* — Shawn X Gu
*Assistant Examiner* — Mohammad S Hasan
(74) *Attorney, Agent, or Firm* — Holland & Hart LLP

(57) ABSTRACT

Methods, systems, and devices for illegal operation reaction are described. A memory device may receive one or more commands to perform one or more respective access operations on an array of memory cells. A first circuit of the memory device may determine that the one or more commands would violate one or more thresholds associated with operation of the memory device, such as a timing threshold. In some cases, the first circuit may compare the one or more commands to the one or more patterns of commands stored at the memory device. A second circuit of the memory device may erase one or more memory cells of the memory device based on determining that the one or more thresholds associated with operation of the memory device would be violated, based on comparing the set of commands to the one or more patterns, or a combination thereof.

20 Claims, 6 Drawing Sheets

ILLEGAL OPERATION REACTION AT A MEMORY DEVICE

FIELD OF TECHNOLOGY

The following relates to one or more systems for memory, including techniques for illegal operation reaction at a memory device.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
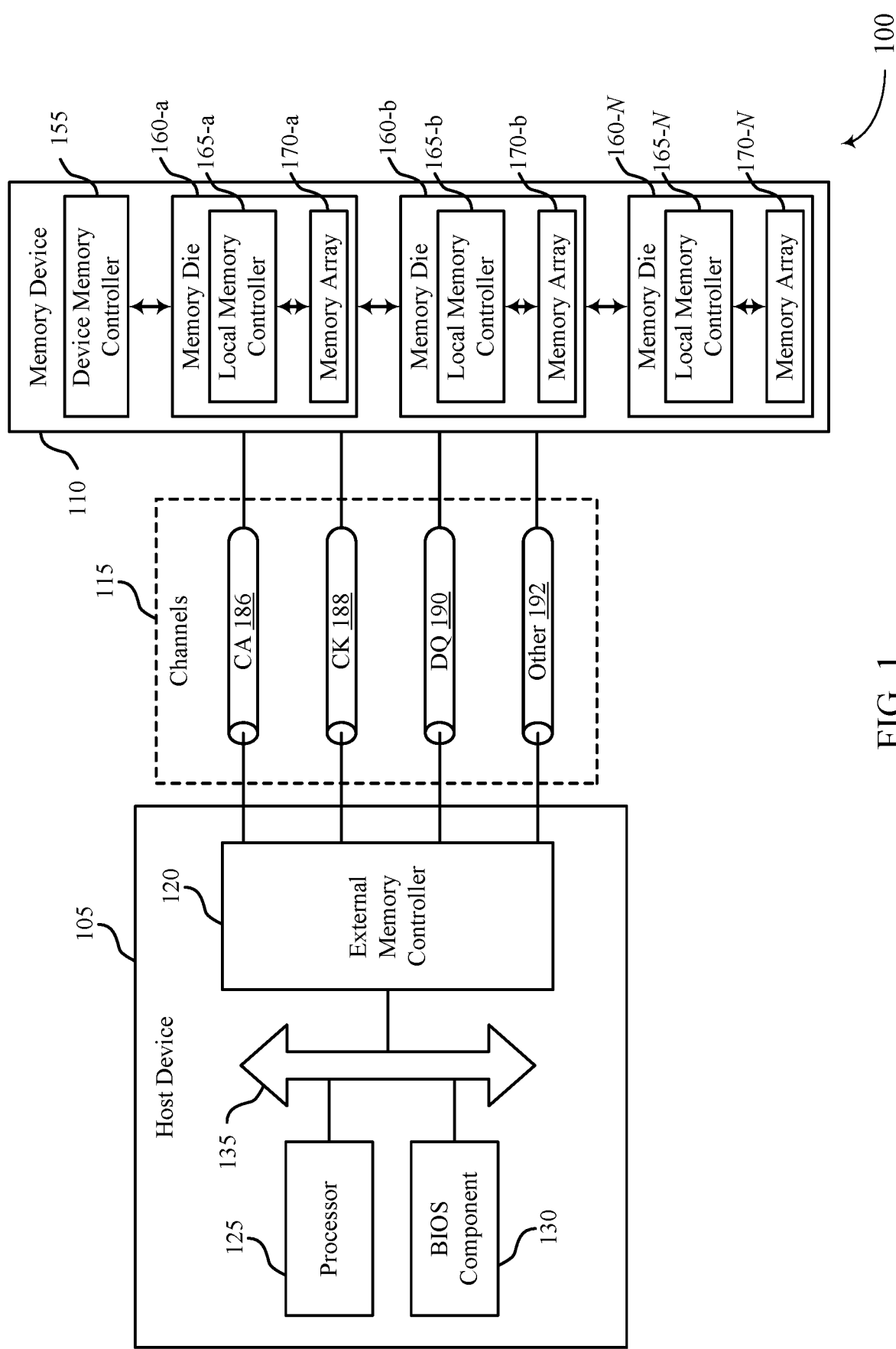
FIG. 1 illustrates an example of a system that supports techniques for illegal operation reaction at a memory device in accordance with examples as disclosed herein.

A memory device may receive a command to perform an access operation on one or more memory cells of the memory device. The command may include information related to the location (e.g., addresses) of memory banks, rows or columns of memory cells, or memory cells for which the operation is to be performed, or any combination thereof. In some cases, a memory device may receive an illegal (e.g., invalid) command. A command may be illegal if, for instance, performing the command may cause one or more of the refresh thresholds or other thresholds of the memory device to be violated (e.g., the requested access operation is incompatible with design characteristics of the memory device). In one example, a command may be associated with a rowhammer event in which a memory row may be activated repeatedly within a refresh time interval. As such, the rowhammer event may result in a side effect for the memory device in which memory cells interact electrically between themselves by leaking or exchanging charge, possibly changing the contents of nearby memory rows that were not addressed in the original access operation. In some examples, commands that result in illegal operations of the memory device may lead to a reduced security of the memory device (e.g., a bad actor could violate thresholds of the memory device to identify and characterize metrics of the memory device). Additionally, or alternatively, these illegal operations may also degrade performance and operation of the memory device by disturbing the intended behavior of the memory cells in the memory device, among other aspects.

Accordingly, a memory device may implement techniques for illegal command detection and reaction as described herein. For example, the memory device may receive one or more commands, for example, from an external component (e.g., a host device) and determine if one or more thresholds associated with operation of the memory device would be violated by one or more access operations of the one or more commands. In examples where the command may result in the one or more thresholds being violated, the memory device may use an illegal reaction circuit to erase one or more memory cells of the memory device (e.g., memory cells at addresses indicated in the command). By erasing the one or more memory cells, the memory device may realize increased security (e.g., a bad actor may be unable to obtain metrics or parameters of the memory device by monitoring changes in the states of the memory cells in response to illegal operations). Additionally or alternatively, the illegal reaction circuit may block the memory device from performing the command and notify, for example, the host device of illegal command activity. In some examples, the memory device may include a component, such as a fuse register, that may enable and disable the illegal monitoring circuit and the illegal reaction circuit of the memory device (e.g., a setting of the fuse may disable the circuits or enable the circuits). In some examples, the memory device may include a mode register. For example, the memory device may compare the set of commands to one or more patterns indicated by the mode register (e.g., the mode register stores or represents the patterns). The memory device may react to or refrain from reacting to an illegal operation based on whether the mode register includes a pattern that matches the set of commands (e.g., if the mode register includes a pattern corresponding to the detected illegal operation, the illegal reaction circuit may allow the operations of the set of commands to be performed). In some examples, setting the mode register may enable a first subset of commands and disable a second subset of commands. Based on the detection of illegal commands and erasing data associated with the illegal commands, the memory device will benefit from an increase in security of the device, performance of the device, or both.

Features of the disclosure are initially described in the context of systems and dies as described with reference to FIGS. 1 and 2. Features of the disclosure are described in the context of systems and process flows as described with reference to FIGS. 3 and 4. These and other features of the disclosure are further illustrated by and described with reference to an apparatus diagram and flowcharts that relate to techniques for illegal operation reaction at a memory device as described with reference to FIGS. 5 and 6.

FIG. 1 illustrates an example of a system 100 that supports techniques for illegal operation reaction at a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

In some examples, the system 100 or the host device 105 may include various peripheral components. The peripheral components may be any input device or output device, or an interface for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s) (e.g., input devices, output devices). The I/O controller may manage peripherals that are not integrated into or with the system 100 or the host device 105. In some examples, the I/O controller may represent a physical connection (e.g., one or more ports) with external peripheral components.

In some examples, the system 100 or the host device 105 may include an input component, an output component, or both. An input component may represent a device or signal external to the system 100 that provides information (e.g., signals, data) to the system 100 or its components. In some examples, and input component may include an interface (e.g., a user interface or an interface between other devices). In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

A memory die 160 may be an example of a two-dimensional (2D) array of memory cells or may be an example of a three-dimensional (3D) array of memory cells. In some examples, a 2D memory die 160 may include a single memory array 170. In some examples, a 3D memory die 160 may include two or more memory arrays 170, which may be stacked on top of one another or positioned next to one another (e.g., relative to a substrate). In some examples, memory arrays 170 in a 3D memory die 160 may be referred to as or otherwise include different sets (e.g., decks, levels, layers, dies). A 3D memory die 160 may include any quantity of stacked memory arrays 170 (e.g., two high, three high, four high, five high, six high, seven high, eight high). In some 3D memory dies 160, different decks may share a common access line such that some decks may share one or more of a word line, a digit line, or a plate line.

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive information (e.g., data, commands, or both) from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, the memory device 110 may receive one or more commands from the host device 105 requesting to perform a set of access operations on one or more memory cells of the memory device 110. A command may include information related to the location (e.g., addresses) of memory banks, memory arrays 170 of one or more memory dies 160, and/or memory cells for which the operation is to be performed. In some cases, a memory device 110 may receive an illegal or non-valid command. A command may be illegal if, for instance, performing the command may cause one or more thresholds associated with operation of the memory device 110 to be violated. In some examples, the one or more thresholds may be examples of timing thresholds configured for operation of a memory cell such as a row refresh cycle time. In some examples, the one or more thresholds may be examples of a configured quantity of operations that may be applied to a set of memory cells over a configured duration of time.

As such, the memory device 110 may utilize one or more circuits to determine if a command violates the one or more thresholds (e.g., includes an illegal access operation) and interact with memory cells of the memory device 110 based on whether an access operation is illegal. For instance, a first circuit may compare the one or more commands to a set of commands indicated by the memory device 110 (e.g., at a mode register) when determining if the one or more thresholds would be violated. In examples where the command would result in one or more thresholds being violated, the memory device 110 may use a second circuit to erase one or more memory cells indicated in the command. Erasing data from memory cells associated with a requested illegal operation, may increase the security of data of the memory device 110 and reduce potential performance degradation of the memory device 110. In some examples, the memory device may include a fuse register that may enable or disable the first and second circuits of the memory device 110.

Figure 2:
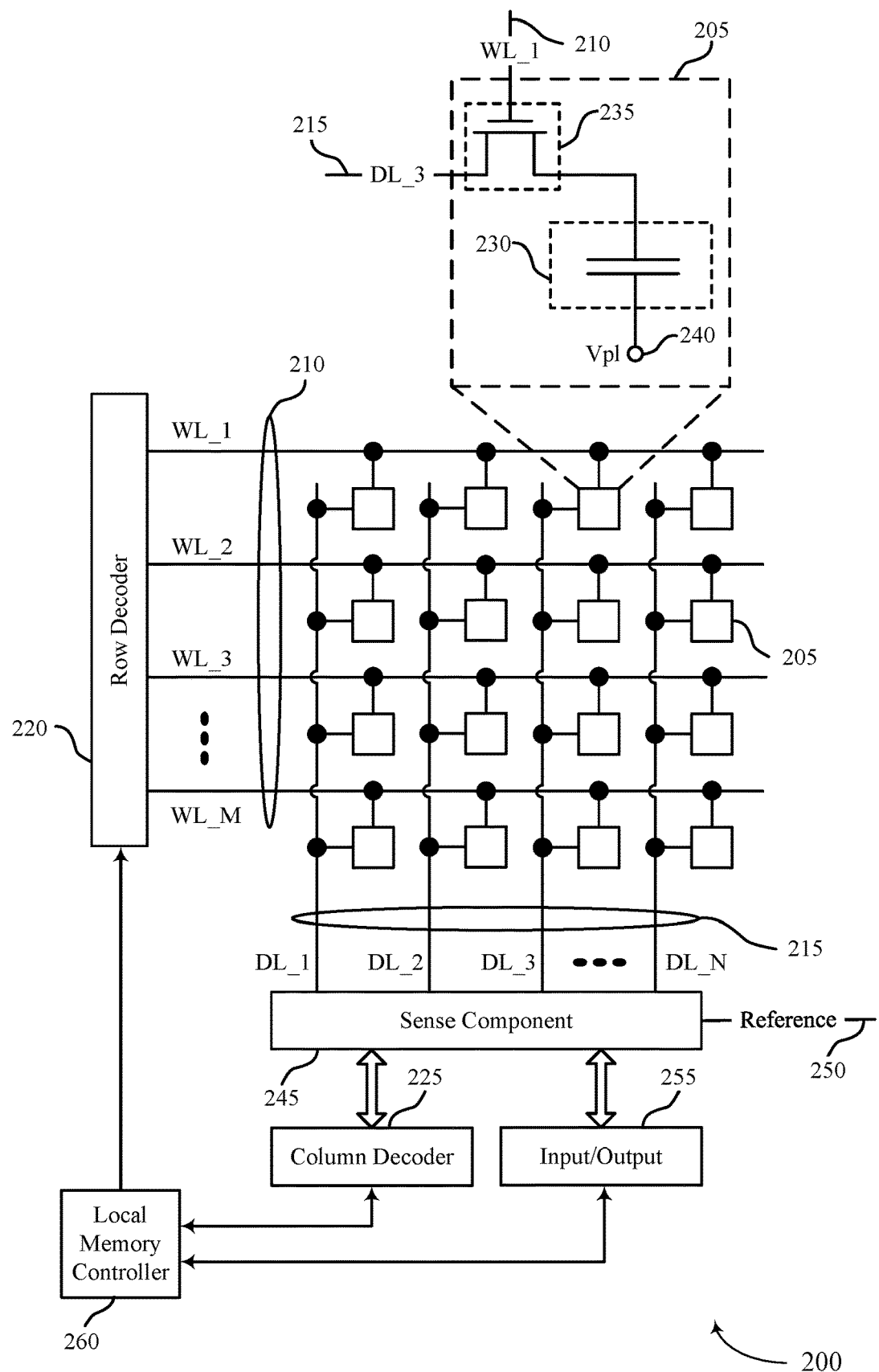
FIG. 2 illustrates an example of a memory die that supports techniques for illegal operation reaction at a memory device in accordance with examples as disclosed herein.

FIG. 2 illustrates an example of a memory die 200 that supports techniques for illegal operation reaction at a memory device in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210 and digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading, and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or a combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

A word line 210 may be a conductive line in electronic communication with a memory cell 205 that is used to perform access operations on the memory cell 205. In some architectures, the word line 210 may be coupled with a gate of a switching component 235 of a memory cell 205 and may be operable to control the switching component 235 of the memory cell. In some architectures, the word line 210 may be coupled with a node of the capacitor of the memory cell 205 and the memory cell 205 may not include a switching component.

A digit line 215 may be a conductive line that couples the memory cell 205 with a sense component 245. In some architectures, the memory cell 205 may be selectively coupled with the digit line 215 during portions of an access operation. For example, the word line 210 and the switching component 235 of the memory cell 205 may be operable to couple or isolate the capacitor 230 of the memory cell 205 and the digit line 215. In some architectures, the memory cell 205 may be coupled with the digit line 215.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired state (e.g., logic state, charge state). The local memory controller 260 may identify a target memory cell 205 on which to perform the write operation. The local memory controller 260 may identify a target word line 210 and a target digit line 215 coupled with the target memory cell 205 (e.g., an address of the target memory cell 205). The local memory controller 260 may activate the target word line 210 and the target digit line 215 (e.g., applying a voltage to the word line 210 or digit line 215) to access the target memory cell 205. The local memory controller 260 may apply a signal (e.g., a write pulse, a write voltage) to the digit line 215 during the write operation to store a state (e.g., charge) in the capacitor 230 of the memory cell 205. The signal used as part of the write operation may include one or more voltage levels over a duration.

The local memory controller 260 may be operable to perform a read operation (e.g., a sense operation) on one or more memory cells 205 of the memory die 200. During a read operation, the state (e.g., logic state, charge state) stored in a memory cell 205 of the memory die 200 may be evaluated (e.g., read, determined, identified). The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal (e.g., charge, voltage) to the sense component 245 in response to biasing the access lines. The sense component 245 may amplify the signal. The local memory controller 260 may activate the sense component 245 (e.g., latch the sense component) and compare the signal received from the memory cell 205 to a reference (e.g., the reference 250). Based on that comparison, the sense component 245 may determine a logic state that is stored on the memory cell 205.

In some examples, the local memory controller 260 may receive one or more commands from an external device (such as a host device 105) requesting to perform a set of access operations on one or more memory cells 205. A command may contain information related to the location (e.g., addresses) of memory banks and/or memory cells 205 for which the operation is to be performed. In some cases, the local memory controller 260 may receive an illegal or non-valid command. A command may be illegal if, for instance, performing the command may cause one or more thresholds associated with operation of one or more memory cells 205 to be violated. In some examples, the one or more thresholds may be examples of timing thresholds configured for operation of a memory cell 205 such as a row refresh cycle time. In some examples, the one or more thresholds may be examples of a configured quantity of operations that may be applied to a set of memory cells 205 over a configured duration of time.

As such, the local memory controller 260 may utilize one or more circuits to determine if a command violates the one or more thresholds (e.g., includes an illegal access operation) and interact with memory cells 205 based on whether an access operation is illegal. For instance, a first circuit may compare the one or more commands to a set of configured commands (e.g., a set of commands indicated by a mode register) based on determining if the one or more thresholds would be violated. In examples where the command would result in one or more thresholds being violated, the local memory controller 260 may use a second circuit to erase one or more memory cells indicated in the command (e.g., if the mode register does not include an indication that the one or more commands are allowable despite violating the one or more thresholds). Erasing data from memory cells 205 associated with a requested illegal operation, those nearby the cells associated with the illegal operation, or those cells located in the same region (bank, section, die, etc.) as the illegal operation, may increase the security of data stored at the memory cells 205 and reduce potential performance degradation of the memory cells 205. In some examples, a fuse register associated with the local memory controller 260 may enable or disable the first and second circuits.

Figure 3:
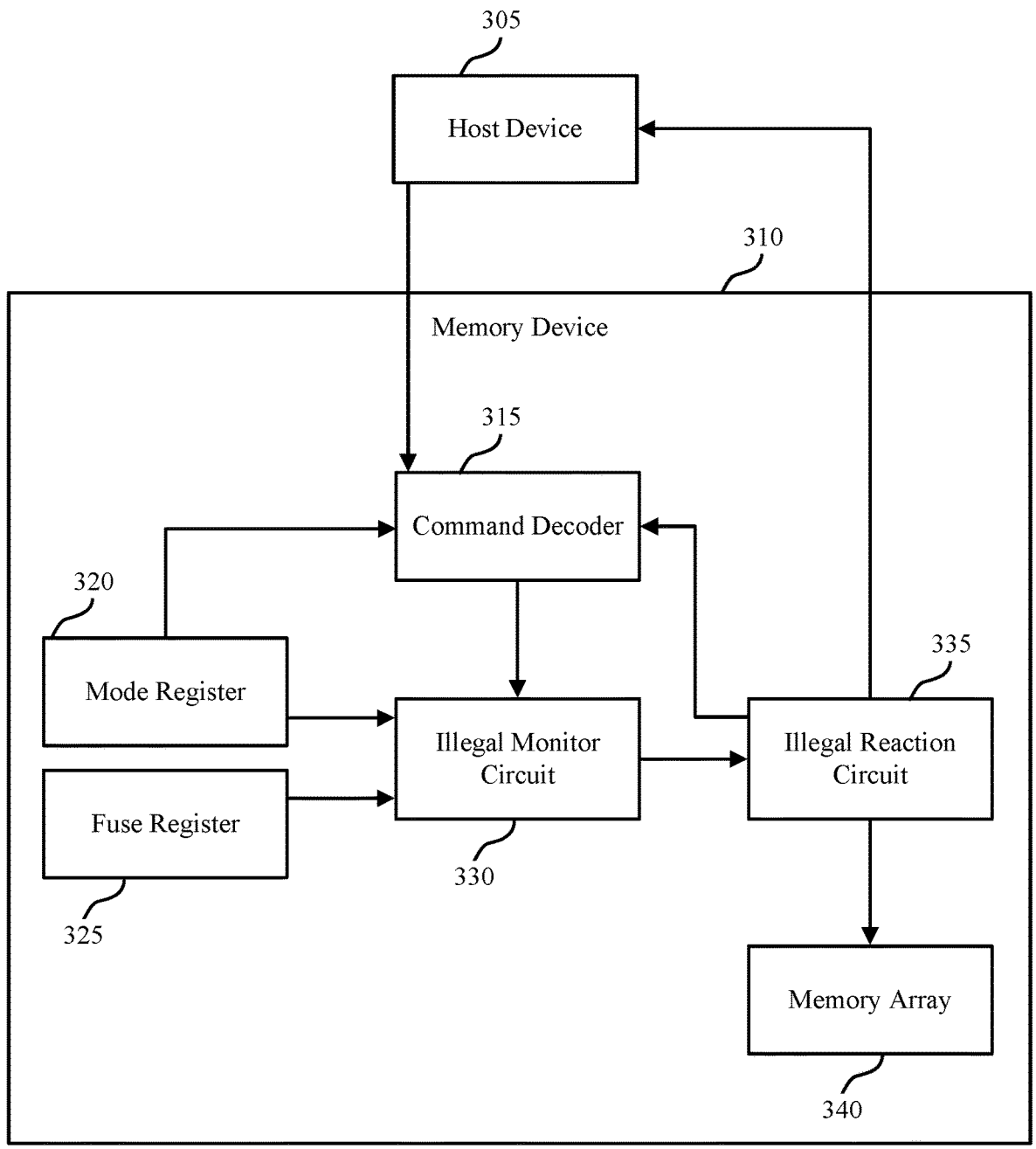
FIG. 3 illustrates an example of a system that supports techniques for illegal operation reaction at a memory device in accordance with examples as disclosed herein.

FIG. 3 illustrates an example of a system 300 that supports techniques for illegal operation reaction at a memory device in accordance with examples as disclosed herein. In some examples, system 300 may implement aspects of system 100 and/or memory die 200 as described herein. For example, the host device 305 and the memory device 310 may be respective examples of a host device 105 and a memory device 110 with reference to the system 100. The memory device 310 may be connected to any of a quantity of electronic devices that may be capable of utilizing memory for the temporary or persistent storage of information, or a component thereof. For example, the memory device 310 may be operably connected to the host device 305. In some examples, the host device 305 may be connected directly to the memory device 310, although in other examples, the host device 305 may be indirectly connected to the memory device 310 (e.g., over a networked connection or through intermediary devices, such as through an external memory controller 120).

The memory device 310 may include one or more components that may be used to characterize commands from the host device 305 according to the techniques described herein (e.g., determine if the commands violate one or more thresholds). For example, the memory device 310 may include a command decoder 315 operable to receive one or more commands from the host device 305 via one or more command pins. In some examples, a command from the host device 305 may include information related to locations (e.g., addresses) of memory banks, rows or columns of memory cells, or memory cells for which to perform an access operation associated with the command. As such, the command decoder 315 may generate various internal signals, such as row command signals and column select signals to select memory rows and columns respectively, based on receiving a command from the host device 305. In some examples, the command decoder 315 may use the various generated signals to perform the access operation associated with the received command. In some examples, the command decoder 315 may be an example of a row decoder 220, a column decoder 225, or a combination thereof, as described with reference to FIG. 2.

In some cases, the one or more commands transmitted by the host device 305 may indicate different types of access operations. During a write (WR) operation, a memory cell of the memory device 310 may be programmed to store a desired logic state. In some cases, a plurality of memory cells may be programmed during a single write operation. In some cases, performing a WR operation may first involve opening a row of a bank (e.g., at the instruction of an activation (ACT) command). A WR command may follow after at least an activate to write time (tRCDWR) after opening the row of the bank. In some examples, the memory device 310 may wait at least a write recovery time (tWR) from the write operation before closing the row of the bank. Additionally, or alternatively, the memory device 310 may wait at least a row address strobe time (tRAS) from opening the row of the bank before closing the row of the bank. The memory device 310 may close the row of the bank (e.g., at the instruction of a precharge (PRE) command) and may wait at least a row precharge time (tRP) before re-opening the row of the memory bank. A time from opening a row of a bank for a first time to opening a row of the memory bank for a next time may be a row cycle time (tRC), which may equal the sum of tRAS and tRP (e.g., the sum of tRAS and tRP as the minimum).

In some cases, the host device 305 may indicate a read (RD) operation (e.g., a sense operation) on one or more memory cells of the memory device 310. During a read operation, the logic state stored in a memory cell may be determined. In some cases, a plurality of memory cells may be sensed during a single read operation. In some cases, performing an RD operation may first involve opening a row of a bank (e.g., at the instruction of an ACT command). An RD command may follow at least an activate to read delay time (tRCDRD) after opening the row of the bank. The memory device 310 may wait at least a read to precharge time (tRTP) from the read operation before closing the row of the bank. Additionally, or alternatively, the memory device 310 may wait at least a time tRAS from opening the row of the bank before closing the row of the bank. Upon closing the banks, the memory device 310 may close the row (e.g., via a PRE command) and may wait at least a time tRP before re-opening the row of the memory bank. A time from opening a row of a bank for a first time to opening a row of the memory bank for a next time may be a tRC.

An amount of time between a first RD and a subsequent RD operation or a first WR and a subsequent WR may be a column to column delay time (tCCD). An amount of time between an RD and a subsequent WR may be a read to write time (tRTW) and an amount of time between a WR and a subsequent RD may be a write to read time (tWTR).

In some memory architectures, accessing the memory device 310 may degrade or destroy the logic state stored in a memory cell. For example, a read operation performed on the memory device 310 may partially or completely discharge the capacitor of the target memory cell. In some examples, the memory device 310 may perform a re-write operation or a refresh (REF) operation, for example, if one or more memory cells are experiencing charge leakage over time (e.g., cell leakage over time, such as in relatively hot temperatures, may result the memory device 310 performing a refresh operation, among other examples). In some cases, performing a REF operation may involve a single bank or all banks (e.g., if an all-bank refresh to occur) being in idle and/or that at least a time tRP has elapsed since the banks last closed. Upon performing the REF operation, the memory device 310 may wait at least a tRFC before opening the memory banks of the memory device 310.

Determining that an access operation associated with a command is illegal may involve determining that performing the command would violate (e.g., fail to satisfy) one or more threshold parameters associated with the memory device 310 (e.g., one or more of RAAIMT, RAAMMT, RAADEC, tRC, tRCDRD, tRCDWR, tRFC, tRFM, tWR, tRTP, tRP, tRAS, tCCD, tWTR, and tRTW, which may be examples of threshold timings or other thresholds). The one or more thresholds associated with operation of the memory device may be examples of design characteristics. In one example, an illegal command may be a row hammer attack in which the access operations may repeatably activate a memory row of the memory device 310 within a single tRFC or multiple tRFC summing up to tREF, violating a threshold associated with operating with memory device 310 (e.g., a timing threshold for refreshing memory cells between access operations—a combination of RAAIMT, RAAMMT and RAADEC parameters, which may be examples of refresh management thresholds associated with mitigating row hammer events). In some cases, consecutive row activations without one or more refresh operation between row activations may degrade performance and operation of the memory device 310 by disturbing the intended behavior. As such, a bad actor may use commands (e.g., ACT, PRE, or REF) in illegal ways to categorize how the memory device 310 responds to the row access events or other refresh management service events. For example, such a bad actor may characterize a threshold quantity of row activations before data is corrupted, among other examples of metrics and design parameters. In another example, an illegal command may attempt to close a bank of the memory device 310 before waiting a duration of tRAS, violating a timing threshold associated with operating with memory device 310. In another example, an illegal command may perform a WR operation that attempts to close a bank of the memory device 310 before waiting a duration of tWR, violating a threshold associated with operating with memory device 310.

As such, the memory device 310 may include an illegal monitor circuit 330 which may be operable to determine if one or more of the commands would violate a configured operation of the memory device 310. For example, the illegal monitor circuit 330 may receive from the command decoder 315 an indication of the one or more commands originating from the host device 305, and may determine if the one or more commands violate the one or more thresholds of the memory device 310, as described herein. If the illegal monitor circuit 330 determines that one or more commands violate one or more of the thresholds, the illegal monitor circuit 330 may indicate to an illegal reaction circuit 335 which commands are in violation.

In some examples, the illegal monitor circuit 330 may compare one or more patterns of commands indicated by the memory device 310 (e.g., indicated by the mode register 320 of the memory device 310) to the one or more commands from the host device 305. In some cases, the one or more patterns of commands may be examples of commands that may violate the one or more thresholds, but may still be performed at the memory device 310. In some examples, the mode register may store the one or more patterns of commands. Additionally, or alternatively, the mode register 320 may allow or disallow various types of commands. For example, the mode register 320 may be associated with a set of bits where the value of each bit may allow or disallow a command based various behaviors, sequence, or timing characteristics associated with the command.

In some examples, the mode register 320 may be operable to indicate (e.g., store or represent) one or more patterns of commands. In some examples, the mode register 320 may store a sequence of commands associated with an allowed or disallowed pattern, the mode register 320 may have an indication of the pattern (e.g., rather than storing each command of the sequence, the mode register 320 may indicate a type of illegal event that is allowed or disallowed), or a combination thereof. For example, the mode register 320 may be an example of a look up table to the patterns (e.g., sequences) of commands. As an illustrative example of a decode procedure, if a mode register 320 parameter is set to a first state (e.g., a mode register 320 bit of 0 is set), such a parameter may indicate that an associated or indicated timing parameter is not allowed faster than a threshold. Alternatively, if the mode register 320 parameter is set to a second state (e.g., a mode register 320 bit of 1 is set), such a parameter may indicate that some accesses (e.g., RAAIMY * RAAMMT accesses), a margin buffer, or both may be allowed to a bank before locking such accesses. Such a parameter may include any quantity or type of states. Stated alternatively, many decodes may exist based on a quantity of mode register bits available in the mode register 320. By setting different parameters (e.g., bits), the mode register 320 may be configured to allow or disallow various behaviors, sequences, or timings.

The mode register 320 may transmit an indication to the illegal monitor circuit 330 of the one or more patterns of commands to use in the determination of whether to react to an illegal operation. If a command from the host device 305 violates the one or more thresholds, and does not match a pattern of the one or more pattern of commands, the illegal reaction circuit may perform one or more actions as described herein (e.g., the illegal reaction circuit 335 may lock a bank of memory cells or inhibit the execution of commands at the command decoder 315, erase one or more memory cells, indicate that an illegal operation has been detected to the host device 305, or any combination thereof). In some other examples, the command (e.g., one or more commands associated with respective access operations) from the host device 305 may match a pattern stored at the mode register 320 (e.g., the mode register 320 may indicate that the pattern is allowable despite violating one or more thresholds). In such examples, the illegal reaction circuit 335 may be configured to refrain from performing the one or more actions based on the indication of the mode register 320.

In some examples, locking the bank of memory cells may disable other access operations from being performed on the bank of memory cells (e.g., other ACT, PRE, RD, WR, and/or REF operations). In some examples, the bank of memory cells may be unlocked once data associated with at least a subset of memory cells of the bank have been erased. For example, the illegal reaction circuit 335 may lock or unlock the bank based on whether the memory cells of the bank have been erased.

Based on receiving an indication of the commands in violation of the one or more thresholds, the illegal reaction circuit 335 may erase data stored at one or more memory cells. For example, if a command in violation indicated an access operation associated with a memory array 340, the illegal reaction circuit 335 may erase at least a subset of the memory cells in the memory array 340 (e.g., DRAM or another example of memory) based on the command violating the one or more thresholds. In some examples, the illegal reaction circuit 335 may erase the entire memory array 340, one or more cells of neighboring memory rows and/or columns of the memory array 340, at least a portion of memory cells of a memory bank associated with the memory array 340, or a combination thereof. By erasing data associated with the memory array 340 (e.g., rather than locking the memory array 340 and keeping the associated data), the memory device 310 may benefit from an increase in data security as a host device 405 may be unable to analyze data associated with an illegal command after the memory array 340 is unlocked.

Additionally, or alternatively, the illegal reaction circuit 335 may transmit an indication to the command decoder 315 to refrain from executing one or more access operations based on determining that the one or more thresholds associated with operation of the memory device 310 may be violated. In some examples, the illegal reaction circuit 335 may delete at least a subset of memory cells based on transmitting this indication. Additionally, or alternatively, the illegal reaction circuit 335 may output a signal to the host device 305, indicating attempt of an illegal operation for a requested command based on determining that the requested command violates the one or more thresholds. Additionally, or alternatively, the signal outputted to the host device 305 may share type information on an I/O (e.g., the signal may indicate a type of the command, a quantity of commands, or other information).

In some examples, the operations of the illegal monitor circuit 330 and the illegal reaction circuit 335 may be enabled or disabled based on a fuse register 325 of the memory device 310. For example, a first setting of the fuse register 325 may enable the illegal monitor circuit 330, the illegal reaction circuit 335, or both, and a second setting of the fuse may disable the illegal monitor circuit 330, the illegal reaction circuit 335, or both.

Figure 4:
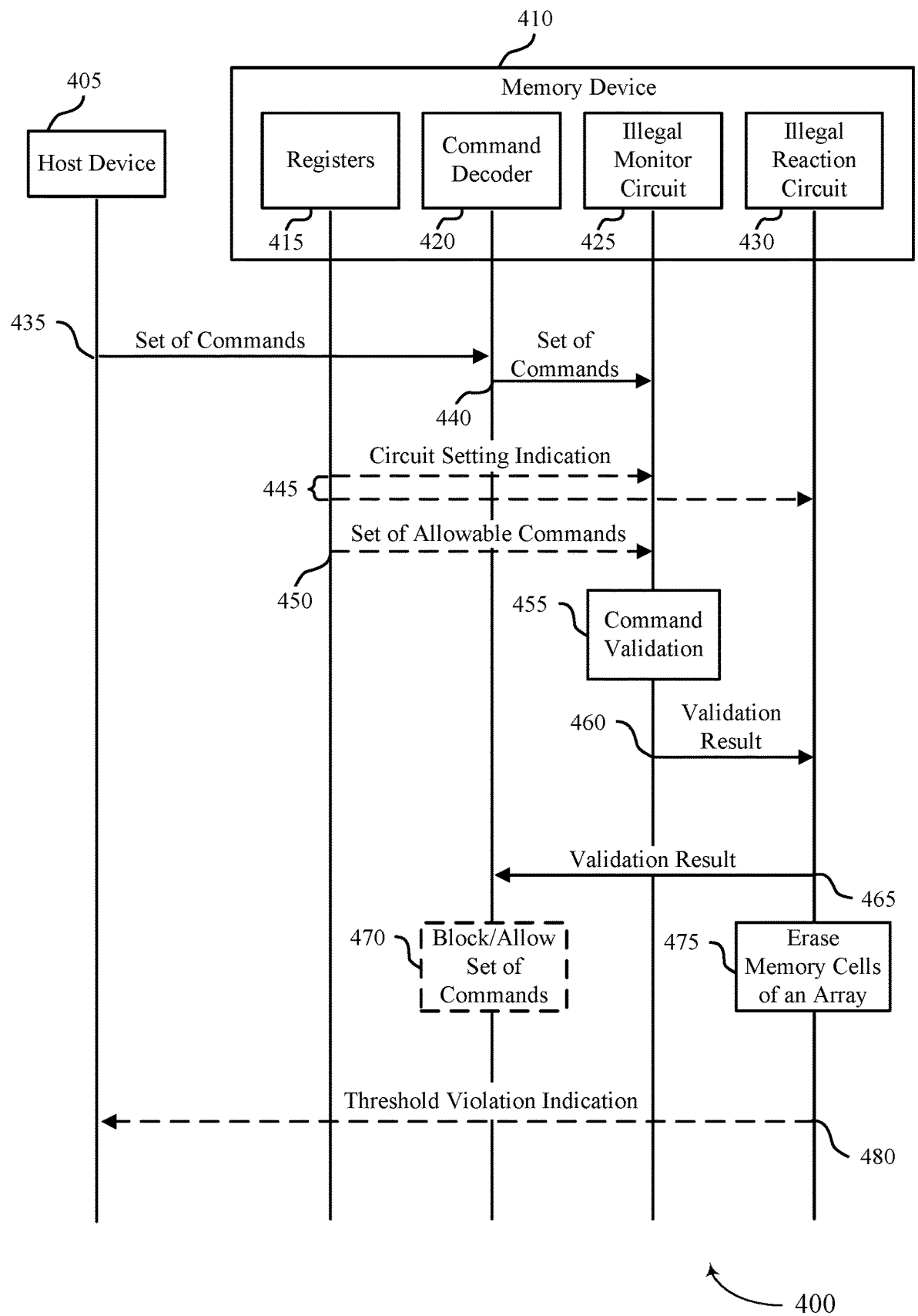
FIG. 4 illustrates an example of a process flow diagram that supports techniques for illegal operation reaction at a memory device in accordance with examples as disclosed herein.

FIG. 4 illustrates an example of a process flow diagram 400 that supports techniques for illegal operation reaction at a memory device in accordance with examples as disclosed herein. In some examples, the process flow diagram 400 may implement aspects described herein with reference to FIG. 3. Accordingly, the operations illustrated by the process flow diagram 400 may be performed at or by a host device 405 and a memory device 410. In some instances, the memory device 410 may include one or more registers 415, a command decoder 420, an illegal monitor circuit 425, and an illegal reaction circuit 430. The memory device 410 may support identifying and reporting illegal access operations requested by the host device 405. Additionally or alternatively, the memory device 410 may support erasing data stored at one or more memory cells based on receiving the illegal access operations.

In the following description of the process flow diagram 400, the operations between the various devices and components may be performed in different orders or at different times. Some operations may also be left out of the process flow diagram 400, or other operations may be added. Some operations shown as being performed by a component may additionally or alternatively be performed by other components, and vice versa.

At 435, the memory device 410 may receive from the host device 405, a set of commands to perform a set of respective access operations on an array of memory cells of the memory device 410. For example, the command decoder 420 of the memory device 410 may be operable to receive the set of commands to perform a set of respective access operations on the array of memory cells. At 440, the command decoder 420 may output the set of commands received from the host device 405 to the illegal monitor circuit 425, or the illegal monitor circuit may receive the set of commands from a same data line as the command decoder 420.

At 445, one or more registers 415 of the memory device 410 (e.g., a fuse register 325 as described with reference to FIG. 3) may output one or more circuit setting indications to the illegal monitor circuit 425 and the illegal reaction circuit 430. For example, a setting of a fuse register 415 may be operable to enable or disable one or more functionalities of the illegal reaction circuit 430, the illegal monitor circuit 425, or both. As an illustrative example, the setting may disable one or more actions performed by the illegal reaction circuit (e.g., the illegal reaction circuit 430 may refrain from erasing data, notifying the host device 405, locking one or more memory cells, and the like, based on the setting of the fuse register 415).

In some examples, the registers 415 may be operable to output an indication to the illegal monitor circuit 425, the illegal reaction circuit 430, or both that disables or enables one or more functionalities at the respective circuits. In such examples of disabling functionalities of the circuits, the indication may include a duration of time in which the respective circuits are disabled, one or more commands of the set of commands the respective circuits are disabled for, or a combination thereof.

At 450, a mode register 415 of the memory device 410 (e.g., a mode register 320 with reference to FIG. 3) may output an indication of a set of allowable commands to the illegal monitor circuit 425. For example, the mode register 415 may be operable to indicate one or more patterns of commands that are allowable (e.g., patterns of commands that may violate one or more thresholds but are configured to be performed without action from the illegal reaction circuit 430). The mode register 415 may output such patterns to the illegal monitor circuit 425 and/or the illegal reaction circuit 430. In some examples, the illegal monitor circuit 425 may use the patterns to determine if one or more commands violate one or more thresholds associated with operating the memory device 410. In some other examples, the illegal monitor circuit may determine that the one or more commands violate the one or more thresholds, and the illegal monitor circuit may refrain from indicating the violated thresholds to the illegal reaction circuit 430 if the one or more commands match a pattern in the mode register 415. Although described as the mode register 415 indicating the set of allowable commands, other configurations or implementations are possible. For example, the illegal monitor circuit may indicate the one or more commands that violate the threshold to the mode register 415, and the mode register 415 may indicate whether the commands match an indicated pattern. Additionally or alternatively, a memory controller of the memory device 410 may read the patterns from the mode register 415 and compare it to the one or more commands from the illegal monitor circuit 425 and/or the command decoder 420. In some examples, the memory controller may perform any quantity or type of operations described as being performed by other components in the process flow diagram 400.

By implementing the mode register 415 and/or the fuse register 415, the memory device 410 may be configurable to enable one or more patterns of commands that may violate timing thresholds. For example, the fuse register 415 may disable reactions to any illegal operations, and the mode register 415 may be operable to disable reactions to a list of allowed patterns while maintaining reactions to other illegal operations.

At 455, the illegal monitor circuit 425 may perform command validation on the one or more sets of commands received from the command decoder 420, at 440. For example, the illegal monitor circuit 425 may determine a violation of one or more thresholds associated with operation of the memory device 410 based on a set of respective access operations associated with the set of commands. In some examples, the illegal monitor circuit 425 may compare the set of commands to the one or more patterns of commands indicated by the second register 415, where determining that the one or more thresholds would be violated is based on the set of commands failing to match the one or more patterns of commands. In some examples, an illegal operation associated with a command may request a set of consecutive row activations without one or more refresh operations between the row activations (e.g., a row hammer attack). In some examples, the one or more thresholds associated with operation of the memory device 410 may be examples of one or more timing thresholds. In such examples, an illegal operation may request an operation on memory cells of the memory device 410 that would violate one or more timing thresholds (e.g., one or more of RAAIMT, RAAMMT, RAADEC, tRC, tRCDRD, tRCDWR, tRFC, tRFM, tWR, tRTP, tRP, tRAS, tCCD, tWTR, and tRTW).

At 460, based on completing the command validations, the illegal monitor circuit 425 may output a command validation result to the illegal reaction circuit 430. For example, the validation result may indicate to the illegal reaction circuit 430 which of the one or more commands sent from the host device 405 are in violation of the one or more thresholds associated with operation of the memory device 410. As such, the illegal monitor circuit 425 may refrain from executing the set of respective illegal access operations based on determining the violation. At 465, the illegal monitor circuit 425 may output an indication of the validation result received from the illegal monitor circuit 425, at 460, to the command decoder 420.

At 470, the command decoder 420 may block or allow the one or more commands requested by the host device 405 based on receiving the validation result, at 465. In some examples, the command decoder 420 may lock a bank associated with at least the subset of an array of memory cells indicated in the one or more commands based on determining that the one or more thresholds associated with operation of the memory device 410 would be violated. In such examples of locking the bank, one or more access operations may be applied to the bank; however, the logic state of a subset of memory cells of the bank may remain unknown to the host device 405 until the logic state is erased and the bank is unlocked. In some examples, the command decoder 420 may lock a bank associated with an array of memory cells neighboring an array of memory cells requested in the one or more commands received from the host device 405.

At 475, the illegal reaction circuit 430 may erase at least a subset of the array of memory cells of the memory device 410 based on determining that the one or more thresholds associated with operation of the memory device 410 would be violated. In some examples, the illegal reaction circuit 430 may erase at least the subset of the array of memory cells based on a setting of the first register 415 enabling the illegal reaction circuit 430 to erase memory cells of the memory device 410.

At 480, the illegal reaction circuit 430 may output a signal to the host device 405 indicating that the one or more thresholds associated with the operation of the memory device 410 would be violated based on determining that the one or more thresholds would be violated. In some cases, the signaling may indicate that the one or more commands requested from the host device 405 are associated with one or more illegal access operations.

Figure 5:
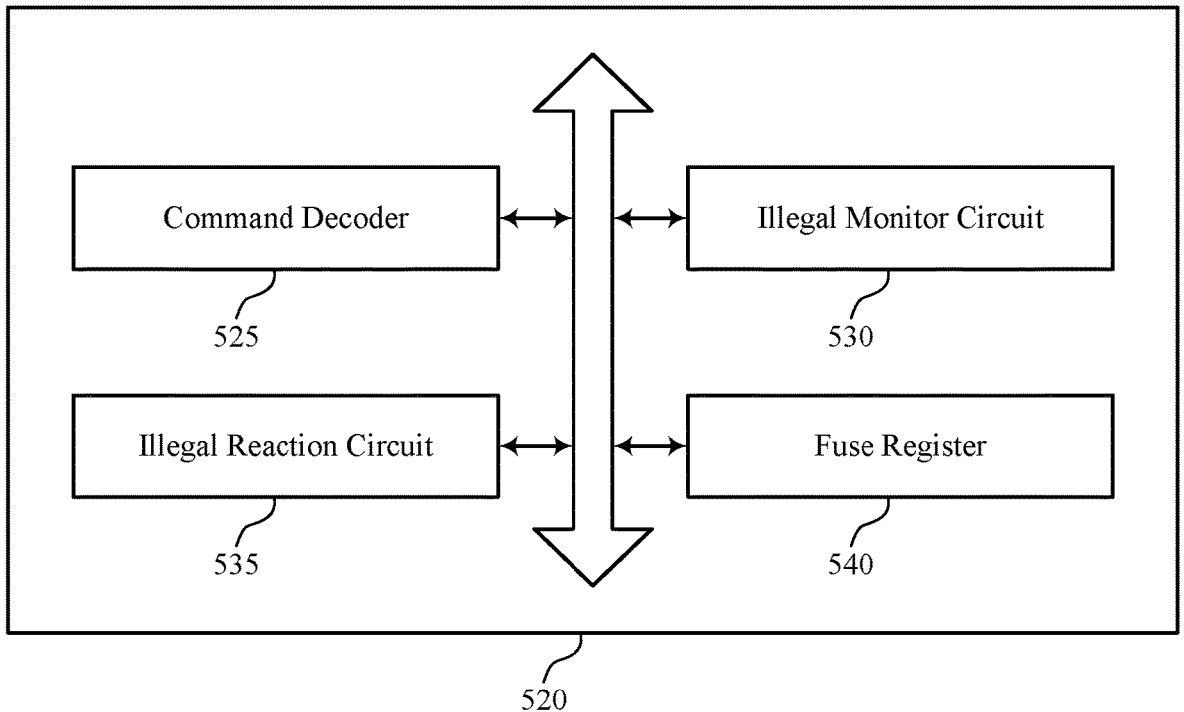
FIG. 5 shows a block diagram of a memory device that supports techniques for illegal operation reaction at a memory device in accordance with examples as disclosed herein.

FIG. 5 shows a block diagram 500 of a memory device 520 that supports techniques for illegal operation reaction at a memory device in accordance with examples as disclosed herein. The memory device 520 may be an example of aspects of a memory device as described with reference to FIGS. 1 through 4. The memory device 520, or various components thereof, may be an example of means for performing various aspects of techniques for illegal operation reaction at a memory device as described herein. For example, the memory device 520 may include a command decoder 525, an illegal monitor circuit 530, an illegal reaction circuit 535, a fuse register 540, or any combination thereof. Each of these components may communicate, directly or indirectly, with one another (e.g., via one or more buses).

The command decoder 525 may be configured as or otherwise support a means for receiving, at the memory device 520, a set of commands to perform a set of respective access operations on an array of memory cells of the memory device. The illegal monitor circuit 530 may be configured as or otherwise support a means for determining that one or more thresholds associated with operation of the memory device 520 would be violated by performing the set of respective access operations. The illegal reaction circuit 535 may be configured as or otherwise support a means for erasing at least a subset of the array of memory cells of the memory device 520 based at least in part on determining that the one or more thresholds associated with operation of the memory device 520 would be violated.

In some examples, the illegal monitor circuit 530 may be configured as or otherwise support a means for comparing the set of commands to one or more patterns of commands stored in the memory device 520, where determining that the one or more thresholds would be violated is based at least in part on the set of commands failing to match the one or more patterns of commands.

In some examples, the command decoder 525 may be configured as or otherwise support a means for receiving a second set of commands to perform a second set of respective access operations on the array of memory cells. In some examples, the illegal monitor circuit 530 may be configured as or otherwise support a means for comparing the second set of commands to the one or more patterns of commands stored in the memory device 520. In some examples, the illegal reaction circuit 535 may be configured as or otherwise support a means for performing the second set of respective access operations based at least in part on the second set of commands matching the one or more patterns of commands. In some examples, a mode register stores the one or more patterns of commands. In some examples, a circuit for erasing at least the subset of the array of memory cells is enabled based at least in part on a setting of a fuse associated with the circuit.

In some examples, the fuse register 540 may be configured as or otherwise support a means for disabling a circuit for erasing at least the subset of the array of memory cells based at least in part on a setting of a fuse associated with the circuit.

In some examples, the illegal reaction circuit 535 may be configured as or otherwise support a means for refraining from executing one or more operations of the set of respective access operations based at least in part on determining that the one or more thresholds would be violated, where erasing at least the subset of the array of memory cells is based at least in part on refraining from executing the one or more operations of the set of respective access operations.

In some examples, the illegal reaction circuit 535 may be configured as or otherwise support a means for outputting a signal to a host device indicating that the one or more thresholds associated with the operation of the memory device 520 would be violated based at least in part on determining that the one or more thresholds would be violated. In some examples, the set of respective operations include a set of consecutive row activations without one or more refresh operations between the set of consecutive row activations.

In some examples, to support determining that the one or more thresholds would be violated, the illegal monitor circuit 530 may be configured as or otherwise support a means for determining that a timing threshold would be violated, the timing threshold indicating a threshold duration between one or more operations and a refresh operation. In some examples, the timing threshold includes a row refresh cycle time.

In some examples, the command decoder 525 may be configured as or otherwise support a means for locking a bank associated with at least the subset of the array of memory cells based at least in part on determining that the one or more thresholds associated with operation of the memory device 520 would be violated.

Figure 6:
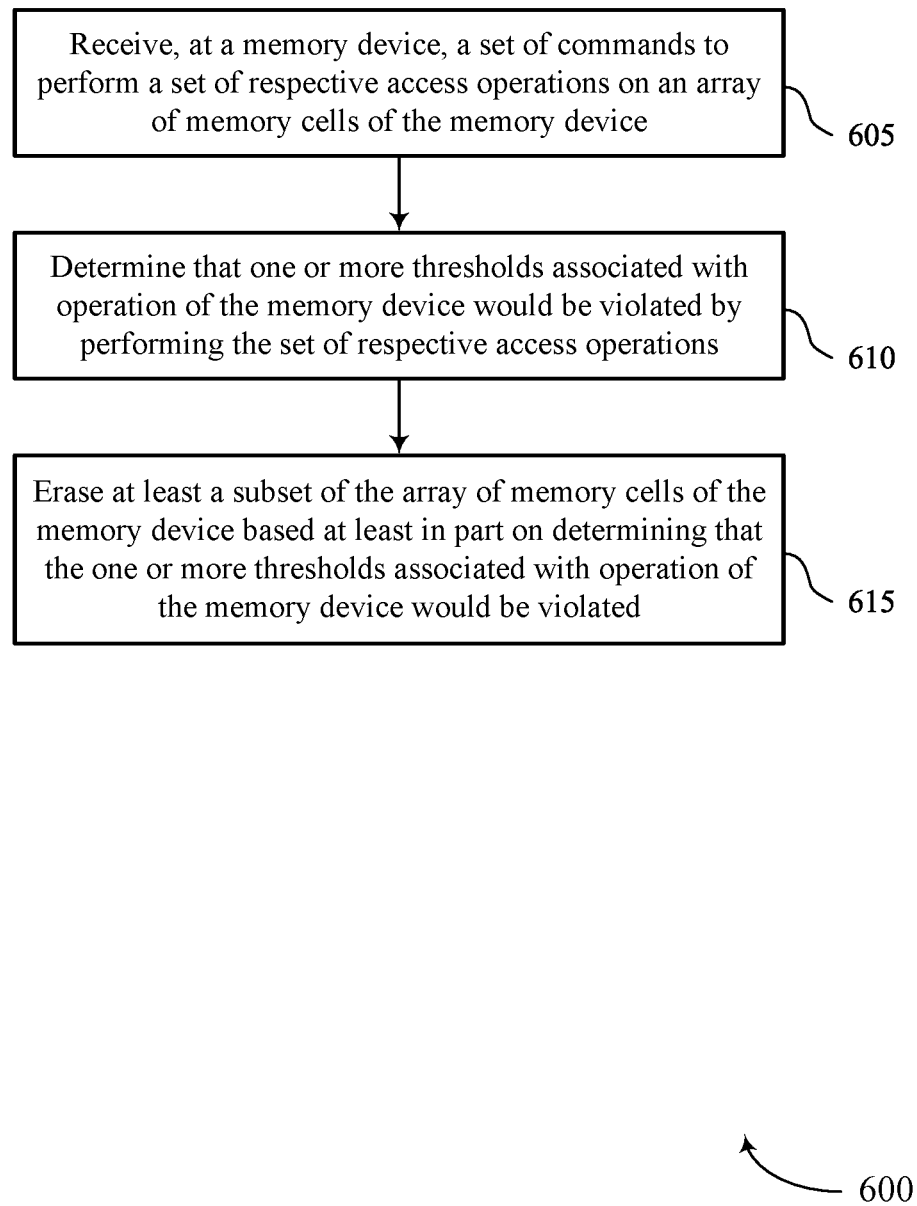
FIG. 6 shows a flowchart illustrating a method or methods that support techniques for illegal operation reaction at a memory device in accordance with examples as disclosed herein.

FIG. 6 shows a flowchart illustrating a method 600 that supports techniques for illegal operation reaction at a memory device in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 605, the method may include receiving, at a memory device, a set of commands to perform a set of respective access operations on an array of memory cells of the memory device. The operations of 605 may be performed in accordance with examples as disclosed herein. In some examples, aspects of the operations of 605 may be performed by a command decoder 525 as described with reference to FIG. 5.

At 610, the method may include determining that one or more thresholds associated with operation of the memory device would be violated by performing the set of respective access operations. The operations of 610 may be performed in accordance with examples as disclosed herein. In some examples, aspects of the operations of 610 may be performed by an illegal monitor circuit 530 as described with reference to FIG. 5.

At 615, the method may include erasing at least a subset of the array of memory cells of the memory device based at least in part on determining that the one or more thresholds associated with operation of the memory device would be violated. The operations of 615 may be performed in accordance with examples as disclosed herein. In some examples, aspects of the operations of 615 may be performed by an illegal reaction circuit 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory device, a set of commands to perform a set of respective access operations on an array of memory cells of the memory device; determining that one or more thresholds associated with operation of the memory device would be violated by performing the set of respective access operations; and erasing at least a subset of the array of memory cells of the memory device based at least in part on determining that the one or more thresholds associated with operation of the memory device would be violated.

Aspect 2: The method, apparatus, or non-transitory computer-readable medium of aspect 1, further including operations, features, circuitry, logic, means, or instructions, or any combination thereof for comparing the set of commands to one or more patterns of commands stored in the memory device, where determining that the one or more thresholds would be violated is based at least in part on the set of commands failing to match the one or more patterns of commands.

Aspect 3: The method, apparatus, or non-transitory computer-readable medium of aspect 2, further including operations, features, circuitry, logic, means, or instructions, or any combination thereof for receiving a second set of commands to perform a second set of respective access operations on the array of memory cells; comparing the second set of commands to the one or more patterns of commands stored in the memory device; and performing the second set of respective access operations based at least in part on the second set of commands matching the one or more patterns of commands.

Aspect 4: The method, apparatus, or non-transitory computer-readable medium of any of aspects 2 through 3 where a mode register stores the one or more patterns of commands.

Aspect 5: The method, apparatus, or non-transitory computer-readable medium of any of aspects 1 through 4 where a circuit for erasing at least the subset of the array of memory cells is enabled based at least in part on a setting of a fuse associated with the circuit.

Aspect 6: The method, apparatus, or non-transitory computer-readable medium of any of aspects 1 through 5, further including operations, features, circuitry, logic, means, or instructions, or any combination thereof for disabling a circuit for erasing at least the subset of the array of memory cells based at least in part on a setting of a fuse associated with the circuit.

Aspect 7: The method, apparatus, or non-transitory computer-readable medium of any of aspects 1 through 6, further including operations, features, circuitry, logic, means, or instructions, or any combination thereof for refraining from executing one or more operations of the set of respective access operations based at least in part on determining that the one or more thresholds would be violated, where erasing at least the subset of the array of memory cells is based at least in part on refraining from executing the one or more operations of the set of respective access operations.

Aspect 8: The method, apparatus, or non-transitory computer-readable medium of any of aspects 1 through 7, further including operations, features, circuitry, logic, means, or instructions, or any combination thereof for outputting a signal to a host device indicating that the one or more thresholds associated with the operation of the memory device would be violated based at least in part on determining that the one or more thresholds would be violated.

Aspect 9: The method, apparatus, or non-transitory computer-readable medium of any of aspects 1 through 8 where the set of respective operations include a set of consecutive row activations without one or more refresh operations between the set of consecutive row activations.

Aspect 10: The method, apparatus, or non-transitory computer-readable medium of any of aspects 1 through 9 where determining that the one or more thresholds would be violated includes operations, features, circuitry, logic, means, or instructions, or any combination thereof for determining that a timing threshold would be violated, the timing threshold indicating a threshold duration between one or more operations and a refresh operation.

Aspect 11: The method, apparatus, or non-transitory computer-readable medium of aspect 10 where the timing threshold includes a row refresh cycle time.

Aspect 12: The method, apparatus, or non-transitory computer-readable medium of any of aspects 1 through 11, further including operations, features, circuitry, logic, means, or instructions, or any combination thereof for locking a bank associated with at least the subset of the array of memory cells based at least in part on determining that the one or more thresholds associated with operation of the memory device would be violated.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 13: An apparatus, including: an array of memory cells; a command decoder operable to receive a set of commands to perform a set of respective access operations on the array of memory cells; a first circuit operable to determine a violation of one or more thresholds associated with operation of the apparatus based at least in part on the set of respective access operations; and a second circuit operable to erase at least a subset of the array of memory cells based at least in part on determining that the one or more thresholds associated with operation of the memory device would be violated.

Aspect 14: The apparatus of aspect 13, further including: a mode register operable to indicate one or more patterns of commands, where the first circuit is operable to compare the set of commands to the one or more patterns of commands, and where determining the violation of the one or more thresholds is based at least in part on the comparing.

Aspect 15: The apparatus of any of aspects 13 through 14, where: a fuse operable to indicate one of a first setting or a second setting, where the first setting enables the first circuit, the second circuit, or both, and where the second setting disables the first circuit, the second circuit, or both.

Aspect 16: The apparatus of any of aspects 13 through 15, where the second circuit is further operable to: refrain from executing the set of respective access operations based at least in part on determining the violation.

Aspect 17: The apparatus of any of aspects 13 through 16, where the second circuit is further operable to: output a signal to a host device indicating the violation of the one or more thresholds associated with the operation of the apparatus.

An apparatus is described. The following provides an overview of aspects of the apparatus as described herein:

Aspect 18: An apparatus, including: a processor; memory coupled with the processor; and instructions stored in the memory and executable by the processor to cause the apparatus to: receive a set of commands to perform a set of respective access operations on an array of memory cells of the apparatus; determine that one or more thresholds associated with operation of the memory device would be violated by performing the set of respective access operations; and erase at least a subset of the array of memory cells of the apparatus based at least in part on determining that the one or more thresholds associated with operation of the memory device would be violated.

Aspect 19: The apparatus of aspect 18, where the instructions are further executable by the processor to cause the apparatus to: compare the set of commands to one or more patterns of commands stored in the apparatus, where determining that the one or more thresholds would be violated is based at least in part on the set of commands failing to match the one or more patterns of commands.

Aspect 20: The apparatus of aspect 19, where the instructions are further executable by the processor to cause the apparatus to: receive a second set of commands to perform a second set of respective access operations on the array of memory cells; compare the second set of commands to the one or more patterns of commands stored in the apparatus; and perform the second set of respective access operations based at least in part on the second set of commands matching the one or more patterns of commands.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The terms "layer" and "level" used herein refer to an organization (e.g., a stratum, a sheet) of a geometrical structure (e.g., relative to a substrate). Each layer or level may have three dimensions (e.g., height, width, and depth)

and may cover at least a portion of a surface. For example, a layer or level may be a three-dimensional structure where two dimensions are greater than a third, e.g., a thin-film. Layers or levels may include different elements, components, or materials. In some examples, one layer or level may be composed of two or more sublayers or sublevels.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, at a memory device, a set of commands to perform a set of respective access operations on an array of memory cells of the memory device;
determining that one or more thresholds associated with operation of the memory device would be violated by performing the set of respective access operations; and
erasing at least a subset of the array of memory cells of the memory device based at least in part on determining that the one or more thresholds associated with the operation of the memory device would be violated.

2. The method of claim 1, further comprising:
comparing the set of commands to one or more patterns of commands stored in the memory device, wherein determining that the one or more thresholds would be violated is based at least in part on the set of commands failing to match the one or more patterns of commands.

3. The method of claim 2, further comprising:
receiving a second set of commands to perform a second set of respective access operations on the array of memory cells;
comparing the second set of commands to the one or more patterns of commands stored in the memory device; and
performing the second set of respective access operations based at least in part on the second set of commands matching the one or more patterns of commands.

4. The method of claim 2, wherein a mode register stores the one or more patterns of commands.

5. The method of claim 1, wherein a circuit for erasing at least the subset of the array of memory cells is enabled based at least in part on a setting of a fuse associated with the circuit.

6. The method of claim 1, further comprising:
disabling a circuit for erasing at least the subset of the array of memory cells based at least in part on a setting of a fuse associated with the circuit.

7. The method of claim 1, further comprising:
refraining from executing one or more operations of the set of respective access operations based at least in part on determining that the one or more thresholds would be violated, wherein erasing at least the subset of the array of memory cells is based at least in part on refraining from executing the one or more operations of the set of respective access operations.

8. The method of claim 1, further comprising:
outputting a signal to a host device indicating that the one or more thresholds associated with the operation of the memory device would be violated based at least in part on determining that the one or more thresholds would be violated.

9. The method of claim 1, wherein the set of respective access operations comprise a set of consecutive row activations without one or more refresh operations between the set of consecutive row activations.

10. The method of claim 1, wherein determining that the one or more thresholds would be violated comprises:
determining that a timing threshold would be violated, the timing threshold indicating a threshold duration between one or more operations and a refresh operation.

11. The method of claim 10, wherein the timing threshold comprises a row refresh cycle time.

12. The method of claim 1, further comprising:
locking a bank associated with at least the subset of the array of memory cells based at least in part on determining that the one or more thresholds associated with the operation of the memory device would be violated.

13. An apparatus, comprising:
an array of memory cells;
a command decoder operable to receive a set of commands to perform a set of respective access operations on the array of memory cells;
a first circuit operable to determine a violation of one or more thresholds associated with operation of the apparatus based at least in part on the set of respective access operations; and
a second circuit operable to erase at least a subset of the array of memory cells based at least in part on determining that the one or more thresholds associated with the operation of a memory device would be violated.

14. The apparatus of claim 13, further comprising:
a mode register operable to indicate one or more patterns of commands, wherein the first circuit is operable to compare the set of commands to the one or more patterns of commands, and wherein determining the violation of the one or more thresholds is based at least in part on the comparing.

15. The apparatus of claim 13, wherein:
a fuse operable to indicate one of a first setting or a second setting, wherein the first setting enables the first circuit, the second circuit, or both, and wherein the second setting disables the first circuit, the second circuit, or both.

16. The apparatus of claim 13, wherein the second circuit is further operable to:
refrain from executing the set of respective access operations based at least in part on determining the violation.

17. The apparatus of claim 13, wherein the second circuit is further operable to:
output a signal to a host device indicating the violation of the one or more thresholds associated with the operation of the apparatus.

18. An apparatus, comprising:
a processor;
memory coupled with the processor; and
instructions stored in the memory and executable by the processor to cause the apparatus to:
receive a set of commands to perform a set of respective access operations on an array of memory cells of the apparatus;
determine that one or more thresholds associated with operation of a memory device would be violated by performing the set of respective access operations; and
erase at least a subset of the array of memory cells of the apparatus based at least in part on determining that the one or more thresholds associated with the operation of the memory device would be violated.

19. The apparatus of claim 18, wherein the instructions are further executable by the processor to cause the apparatus to:

compare the set of commands to one or more patterns of commands stored in the apparatus, wherein determining that the one or more thresholds would be violated is based at least in part on the set of commands failing to match the one or more patterns of commands.

20. The apparatus of claim 19, wherein the instructions are further executable by the processor to cause the apparatus to:
receive a second set of commands to perform a second set of respective access operations on the array of memory cells;
compare the second set of commands to the one or more patterns of commands stored in the apparatus; and
perform the second set of respective access operations based at least in part on the second set of commands matching the one or more patterns of commands.

* * * * *